(12) United States Patent
Kliskey

(10) Patent No.: US 7,261,136 B1
(45) Date of Patent: Aug. 28, 2007

(54) TIRE MOUNTING TOOL

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 0 days.

(21) Appl. No.: 11/356,155

(22) Filed: Feb. 16, 2006

(51) Int. Cl.
*B60C 25/02* (2006.01)
*B66F 15/00* (2006.01)

(52) U.S. Cl. ................................. 157/1.3; 157/1.17
(58) Field of Classification Search ............ 157/1.3, 157/1.1, 1.17; 254/50.1, 131
See application file for complete search history.

(56) References Cited

U.S. PATENT DOCUMENTS

| | | | |
|---|---|---|---|
| 2,188,211 A * | 1/1940 | Tilson | 157/1.3 |
| 5,123,470 A * | 6/1992 | Tran | 158/1.3 |
| 5,265,661 A * | 11/1993 | Tran | 157/1.3 |
| D395,809 S * | 7/1998 | Brown et al. | D8/31 |
| 6,588,479 B1 | 7/2003 | Kliskey | 157/1.3 |
| 6,684,927 B1 | 2/2004 | Kliskey | 157/1.3 |
| 6,712,114 B2 | 3/2004 | Kliskey | 157/1.3 |
| 6,913,061 B2 | 7/2005 | Kliskey | 157/1.3 |
| 7,163,041 B1 * | 1/2007 | Tran | 157/1.3 |

* cited by examiner

*Primary Examiner*—David B Thomas
(74) *Attorney, Agent, or Firm*—Renner, Kenner, Greive, Bobak, Taylor & Weber

(57) ABSTRACT

A mounting tool and method for mounting a tire onto a rim, the tool including a working end having a tip insertable between the tire's beads and the rim and adapted to lift the beads on to the rim, a body portion extending upward relative to the tip to hold the bead as it is stretched on to the rim, and an extension connecting the tip and body portion to the handle. The extension has a first portion having a radial extent adapted for receipt between the beads of the tire as the working end is rotated, and a second portion defining a second clearance that opens axially inward to receive the second bead therein as the working end is rotated to mount the first bead. With the first portion received between the first and second beads and the second portion providing a clearance for the second bead, the handle is rotated radially outward relative to the rim and body weight applied downwardly to the handle to mount the first bead. Using the leverage created by the extension, the second bead is mounted by inserting the tip between the second bead and the rim, and rotating the handle radially outward and downward to force the second bead on to the rim.

14 Claims, 4 Drawing Sheets

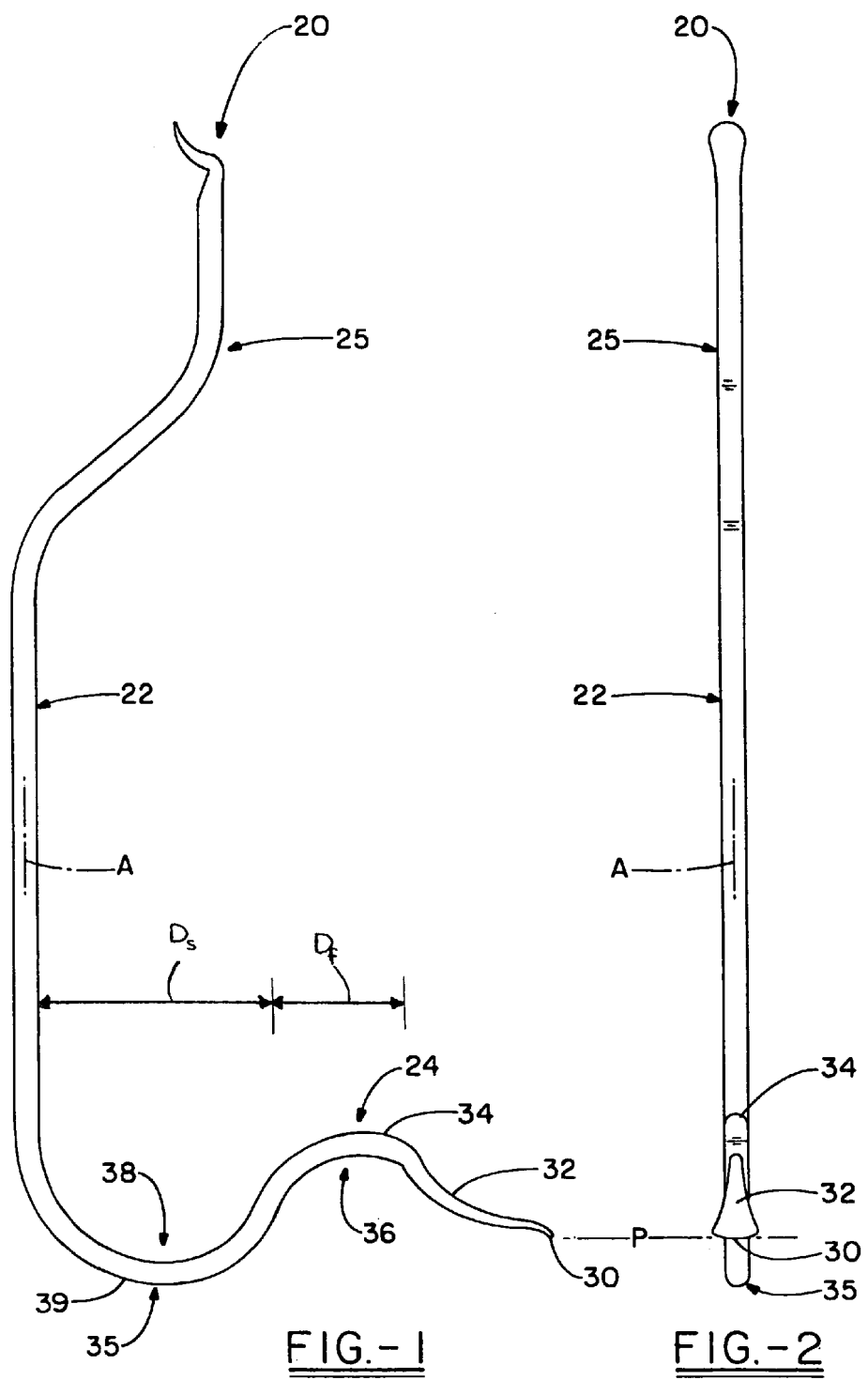

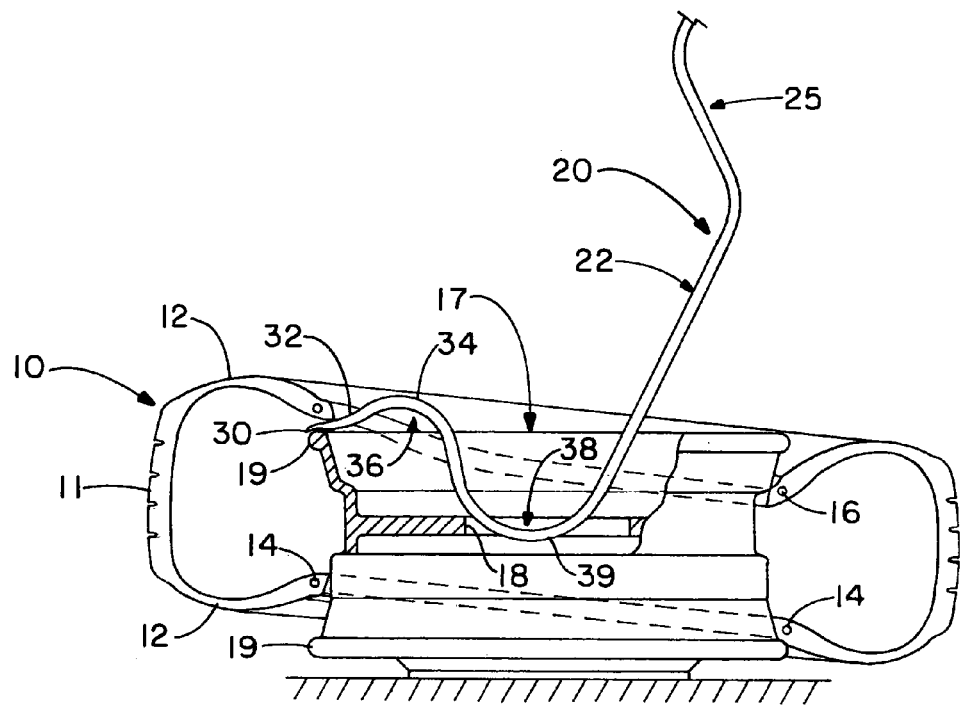
FIG.-7
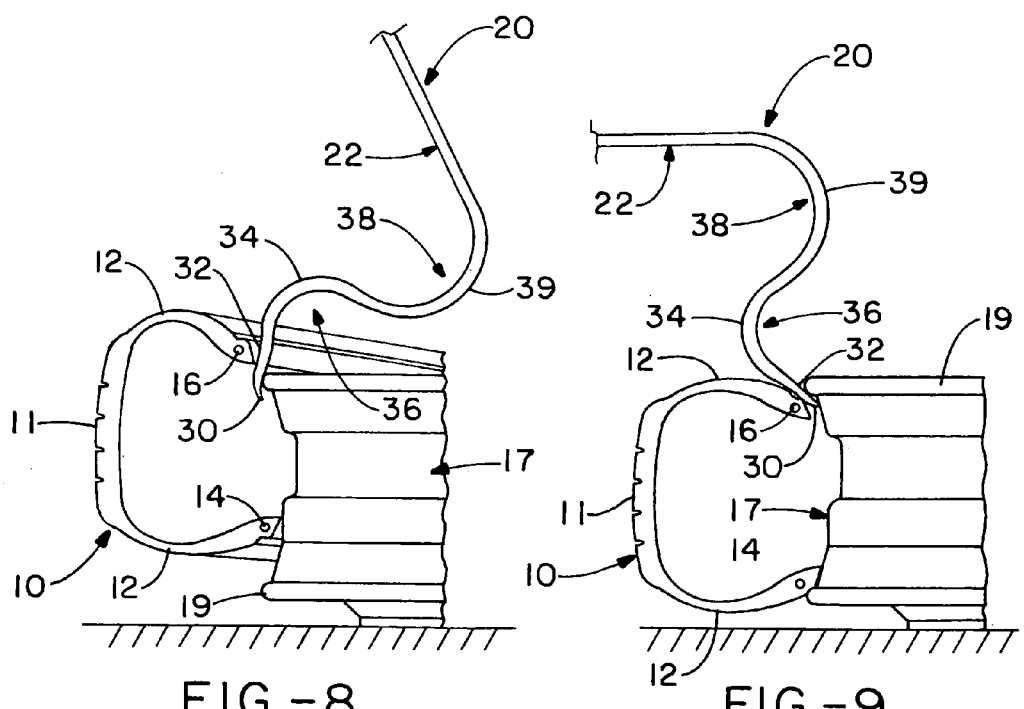
FIG.-8
FIG.-9

TIRE MOUNTING TOOL

TECHNICAL FIELD

The present invention relates generally to a tool for mounting tires to wheel rims and, more particularly, to a manually operative tire mounting tool for providing mechanical advantage in mounting a tire to a wheel rim.

BACKGROUND ART

Pneumatic tires require repair or replacement from time to time because of sustained wear or damage. To effectuate such repair or replacement, it is generally required that the defective tire be removed from its associate wheel rim and a new or repaired tire remounted to the rim.

A variety of tools of varying configurations have been developed for providing a user with mechanical advantage in mounting a tire to a wheel rim. Such tools typically comprise an elongate bar having a handle at one end and an opposite working end adapted for insertion between the bead of a tire and its associate wheel rim.

To utilize the implement, the tool working portion is inserted manually by the user between the bead of the tire and its associate wheel rim. Thereafter, the user applies pressure on the handle, making a lever of the tool and utilizing the wheel rim as a fulcrum. Pressure upon the handle causes the tool to engage the tire bead and move a segment of the bead inward, whereby disengaging the bead segment from the rim. The tool is then redeployed along the tire to an adjacent location, and the procedure is repeated upon a corresponding adjacent bead segment. Repeated redeployment and utilization of the tool about the periphery of the tire pulls a sufficient length of the tire bead inward until the tire is free for removal from the rim in its entirety. In more recent years, machines have been developed which rotate the tire in conjunction with the use of the tool to alleviate the need for moving the tool.

While the prior art is replete with mounting tools, the basic design has not changed significantly over the years. Known designs, while working well to an extent, have proven less than satisfactory in providing an optimally functional tire mounting implement. Some known devices mount tubeless truck tires by using separate tools for each tire bead. A first mounting tool is used to pull the first bead of the tire into the rim. Thereafter, a second mounting tool is inserted to press the second bead behind the rim to complete the mounting procedure. Separate implements, however, increase cost and complicate the tire changing procedure.

Other known designs use a straight bar having a tip that angles downwardly from the longitudinal plane of the tool. The downwardly-turned tip, while providing an advantage in creating a pronounced fulcrum, makes insertion of the tool between the tire bead and wheel relatively more difficult. Moreover, dislodging the angled tip of such a tool is frequently problematic and laborious. A further deficiency in such known tools is that their configuration does nothing to inhibit migration of the tire upwardly along the handle during use. With pressure being applied to the sidewall, the bead of the tire tends to move away from the rim and upward along the tool, decreasing the applied leverage of the tool. The profile of known straight tools does not inhibit this undesirable consequence.

A further deficiency exists in known tire mounting tools. To force the bead of a tire below a rim flange, a substantial segment of the sidewall must be compressed inward a significant extent. Such a deflection requires substantial force. To compensate, the user generally must progress about the tire in small increments, pressuring adjacent small portions or bites of the bead below the rim flange. As the user progressively moves the tool around the rim mounting the bead in a series of bites, the bead becomes progressively more taut and difficult to manipulate. Toward the end of the mounting process, the bead is extremely taut about the rim and difficult to manipulate, making insertion of the tool increasingly difficult. Known tools are typically difficult to insert and remove from between a taut tire bead and a wheel rim.

Moreover, known tools that incorporate a bend proximate the tire mounting tip experience a further difficulty. As the bend of the tool working end is pressed against the front edge of the bead to work the tool underneath the bead, the tool often catches on the rim flange. In order to avoid catching on the rim flange, the tool must be inserted by the user beneath the bead with the tool working end angled upward. Such an angle of insertion, however, is generally not available because the tool handle typically exceeds the rim diameter, and the handle cannot be brought below the level of the bead without striking the rim. Also, when mounting the first bead, the tool's radial progress is impeded by contact with the second bead. Finally, a further disadvantage exists in that the tool impinges against the sidewall of the tire during leverage activity.

SUMMARY OF THE INVENTION

It is therefore, an object of the present invention to provide an improved tire mounting tool.

In light of the foregoing, the present invention generally provides a tire mounting tool for mounting a first bead and a second bead of a tire on a rim, the tire mounting tool including a handle, a working end extending generally radially outward from the handle, the working end including a tip adapted to be inserted between the rim and a bead of the tire, a body portion extending axially inward as it extends radially inward from the tip, and an extension having a first portion extending radially inward from the body portion and a second portion extending radially inward from the first portion connecting the extension to the handle, wherein the first portion extends radially a distance orthogonal to the handle, the distance of the first portion adapted for receipt between the beads of the tire and wherein the second portion extends axially outward relative to the first portion, the first portion defining a first clearance between the second portion and the body portion, and the second portion then extending radially inward and axially inward toward the handle to define a second clearance between the handle and the first portion adapted to receive the second bead of the tire as the first bead of the tire is mounted.

The present invention further provides a tire mounting tool for mounting first and second beads of a tire on a rim, the tire mounting tool including a handle; and a working end extending generally radially outward from the handle, the working end including a tip adapted to be inserted between the rim and a bead of the tire; a body portion extending radially and axially inward from the tip; and an extension including a first portion extending radially inward from the body portion, a second portion extending axially outward from the first portion defining a first clearance opening axially outward adjacent to the first portion, and radially inward to connect to the handle defining a second clearance opening axially inward adjacent to the second portion; wherein the first and second portions each extend radially a distance orthogonal to the handle wherein the distance of the second portion is equal to or greater than the distance of the first portion.

The present invention still further provides a method of mounting at least a first bead of a tire on a rim, the method includes providing a tire mounting tool having a handle and a working end extending generally radially outward from the handle, the working end including a tip adapted for insertion between the rim and a bead of the tire, a body portion extending axially inward as it extends radially inward from the tip, and an extension having a first portion extending radially inward from the body portion and a second portion extending radially inward from the first portion connecting the extension to the handle, wherein the second portion extends axially outward relative to the first portion, the first portion defining a first clearance between the second portion and the body portion, wherein the first portion extends radially a distance orthogonal to the handle adapted for receipt between the beads of the tire and wherein the second portion then extends radially inward toward the handle and defines a second clearance between the handle and the first portion adapted to receive the second bead of the tire as the first bead of the tire is mounted; inserting the tip between the first bead and the rim with the handle held upright and generally centered over the rim; contacting the tip with the rim to use the tip as a fulcrum; rotating the handle radially outward relative to the center of the rim causing the first portion of the extension to extend between the first and second beads while receiving the second bead in the second clearance; and applying body weight downward against the handle to continue its rotation and stretch the first bead onto the rim.

BRIEF DESCRIPTION OF THE DRAWINGS

FIG. 1 is a side elevational view of a mounting tool according to the present invention.

FIG. 2 is a front elevational view thereof.

FIG. 7 is a side elevational view similar to FIG. 6 showing the mounting tool in a second position for moving the second tire bead onto the wheel rim.

FIG. 8 is a partially-fragmented elevational view similar to FIG. 7 showing a later position of the mounting tool as the second tire bead is moved further onto the wheel rim.

FIG. 9 is an enlarged side elevational view similar to FIG. 8 showing the final position of the mounting tool as the tire is now fully mounted on the wheel rim.

DETAILED DESCRIPTION OF THE INVENTION

Figure 3:
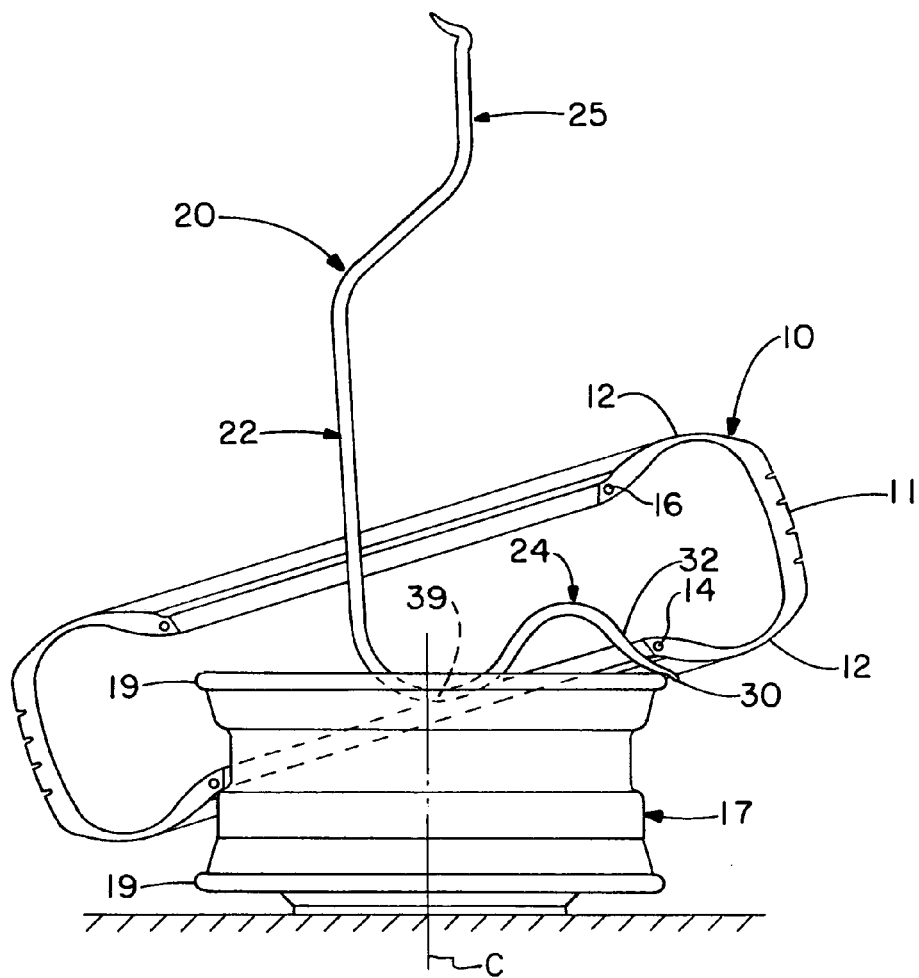
FIG. 3 is a side elevational view of a tire, rim, and mounting tool showing the mounting tool as it may be applied to a first tire bead in the mounting of a tire (shown in section) to a wheel rim.

As shown in the accompanying drawings, a mounting tool, generally referred to by the numeral 20, is used to manually mount a tire 10 comprising, generally, a tread 11, a pair of sidewalls 12, a first bead 14, and a second bead 16. The tire 10 mounts onto a wheel rim 17 having a center bore 18 and a pair of flanges 19. Tire 10 may be of any type including the "super single" type, which may have a large bead diameter and which typically has a much heavier and less elastic construction.

Tire mounting tool 20 generally includes a gripable portion referred to as the handle 22 and a working end 24 that is adapted to work the tire 10 onto the rim 17, as will be described more completely below. In the example shown, the handle 22 and working end 24 are fabricated as a single piece, but it will be appreciated that each may be constructed as a component part and assembled to form the mounting tool 20. To that end, each component may be constructed of the same or different materials, and any material of suitable structural strength may be used. Moreover, the mounting tool 20 components may be constructed of either hollow or solid materials. In the example shown, the mounting tool 20 is constructed of a solid steel forging.

The handle 22 of mounting tool 20 may have any form and is generally elongate to provide suitable leverage for mounting the tire beads 14, 16. Also, the handle 22 may have any cross-section including, for example, the circular cross-section shown. The handle 22 may be generally straight, but the invention is not intended to be so restricted. An offset portion 25, which deviates from the longitudinal axis generally formed by the handle 22, may be provided, as shown. Alternative handles may be asymmetrical in cross-section or incorporate alternate longitudinal or sectional shapes. Accordingly, as used herein, the terms "radial" or "radially" shall mean a direction generally transverse to a longitudinal axis A of the tool 20 without any intended implication that the tool 20 is necessarily of circular cross-section. Similarly, the terms "axial" or "axially" shall mean a direction generally along longitudinal axis A of the tool 20 without any intended implication that the tool 20 is straight throughout the length of the handle 22. Other alternative handles may have geometric irregularities along their respective lengths without departing from the teachings of the present invention.

Figure 6:
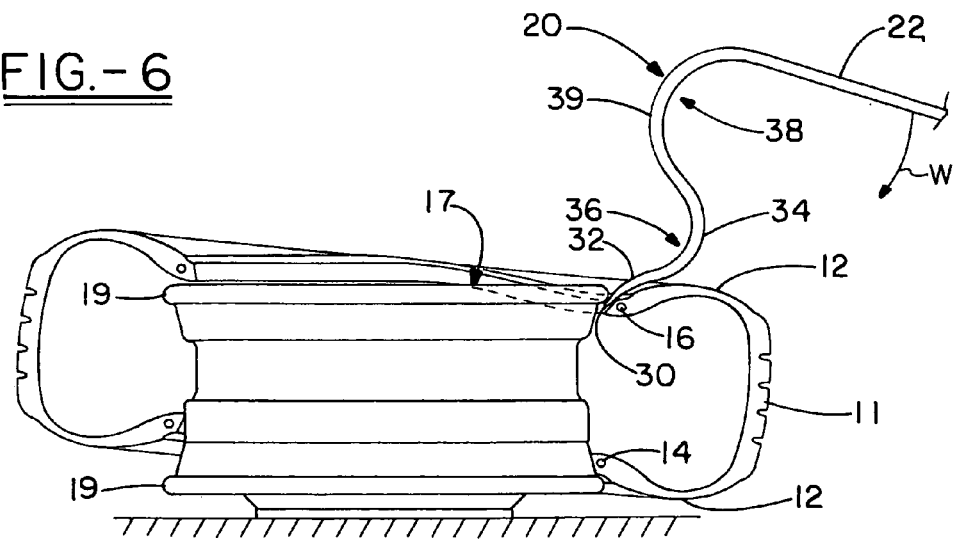
FIG. 6 is a side elevational view similar to FIG. 5 showing a later position of the mounting tool as it moves the second tire bead further onto the wheel rim.

Working end 24 includes a tip 30 that is adapted to be inserted between the tire bead 14, 16 and the rim 17. To that end, the tip 30 may be flattened to provide a slim profile. The tip of the lower surface has a concavity at the point of fulcrum to keep the tool properly located (see drawings). The inner surface 31 of tip 30 may be rounded to facilitate the release of the bead 14, 16 onto rim 17. In the example shown, inner surface 31 is convex causing the tip 30 to extend outward toward its outer radial extremity. A body portion 32 extends inwardly toward the handle 22 from the tip 30 and may, as shown, extend axially inward from tip 30 to prevent the bead from sliding inwardly along the working end 24 as the bead is stretched over the rim 17. As best shown in FIG. 6, the body portion 32 may extend axially inward as it extends radially inward from tip 30 and may form a curve with a radius generally conforming to that of the bead of the tire 10 to spread the forces generated by the tool 20 over the bead reducing the likelihood of damage to the tire 10. Also, tip 30 may extend axially outward to form a concavity between tip 30 and body portion 32 at 33. Concavity 33 receives the edge of rim 17 to locate a working end 24 relative to rim 17 and create a fulcrum for levering each bead 14, 16 onto rim 17.

To facilitate mounting of the tire 10, as will be described more completely below, working end 24 includes an extension, generally indicated by the number 35, that extends radially inward from the body portion 32 to the handle 22.

Extension 35 spaces the tip 30 radially outward from handle 22 to provide greater leverage for manipulating the tire beads 14, 16, as described below.

Figure 4:
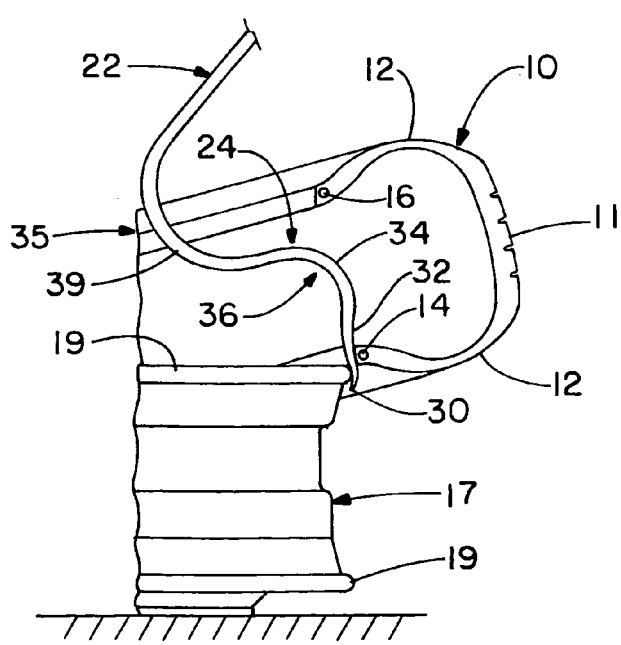
FIG. 4 is a partially-fragmented side elevational view similar to FIG. 3 showing a later position of the mounting tool as it moves the first tire bead further onto the wheel rim.

As best shown in FIG. 1, considering a horizontal plane P extending through the tip 30, extension 35 includes a first portion 34 which extends above the plane P and a second portion 39 that extends below the plane P, respectively, defining a first clearance, generally indicated by the number 36, and a second clearance, generally indicated by the number 38. First portion 34 extends axially inward as it extends radially inward relative to body portion 32 before extending axially outward as it transitions into the second portion 39. As shown, the first and second portions 34, 39 may be formed as a pair of curves, but it will be appreciated that this particular form is not limiting, as other shapes may be used to define clearances 36, 38. As best shown in FIG. 4, the radial extension of first portion 34 is sized to allow first portion 34 to fit between the first and second beads 14, 16 so that the tool 20 may be rotated toward the radial extremity of tire 10 in mounting the beads. Moreover, as shown in FIG. 7, the first portion 34 defines a clearance 36 for the rim 17 that allows the second portion 39 to be seated in the center opening of the rim 17, as described more completely below.

Returning to FIG. 4, the second portion 39 of extension 35 defines a clearance 38 for receipt of the second bead 16. The sizing of the first portion 34 and the provision of a clearance 38 at second portion 39 allows the user to rotate the handle 22 radially outward to mount the first bead 14. In contrast to prior-art mounting tools, this allows the user to pull the handle 22 downward and outward relative to the tire 10 and use their body weight for additional leverage, as will be described more completely below.

Figure 5:
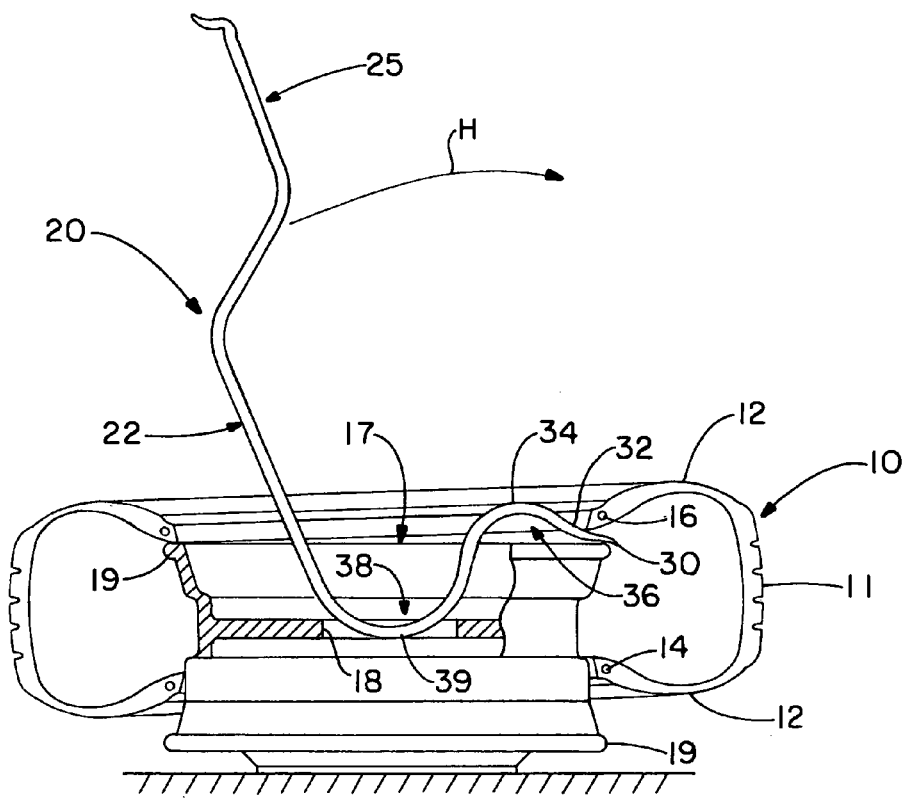
FIG. 5 is a side elevational view similar to FIG. 3 showing the mounting tool as it may be applied to a second tire bead in mounting the tire onto a wheel rim.

As best shown in FIG. 3, working end 24 may be sized such that the center 39 of extension 35 corresponds substantially to the center of the rim 17. The portion 34 and extension 36 may be in the form of a pair of bends that generally have an S-shaped configuration. As best shown in FIG. 5, extension 35 extends radially outward from the handle 22 an extent sufficient to space portion 34 outward of the center opening within the rim 17 and is given a radius R that allows a portion of the extension 35 to rest within the center opening of the rim 17. In this way, the extension 35 may bear on the rim 17 and provide leverage for the insertion of the tip 30 between the rim 17 and the tire bead. This radius R defines the clearance 38 and is sized to allow the extension 35 to wrap around the top bead as the lower bead is mounted on the rim 17 (FIG. 4). In this way, the handle 22 may be pulled over the tire 10 to stretch the bead onto the rim 17. This provides an advantage in that the tool's user may then apply their body weight W to help press the handle 22 downward. When mounting larger tires, such as a super single tire, since the sidewalls are so stiff it is extremely difficult to stretch the bead onto the rim 17. In these cases, the additional mechanical advantage provided by the extension 35 may be needed to mount the tire T. For smaller tires, the mechanical advantage provided by extension 35 reduces the effort needed to mount these tires.

As best shown in FIG. 4, to allow the handle 22 to rotate in this manner, extension 35 defines a second clearance 38 large enough to receive second bead 16 therein. Likewise, first portion 34 may extend a distance $D_f$, measured orthogonally from the handle, less than the distance between the first and second beads 14, 16 to allow it to fit into the gap between the beads 14, 16. Since these distances will vary depending on the size of the tire 10, they may best be described in terms of their relative proportion. The distance of the second portion $D_s$, measured orthogonally from handle 22 may be at least about twice the extent $D_f$ of first portion 34. In view of the overall length of end 20, extension 35 may be at least about half the overall length, with the tip 30 and body portion 32 making up the remainder. When considering the span of the clearances 36, 38, second clearance 38 may be at least equal to or greater than the span of first clearance 36, and more preferably at least approximately 1.5 times as large.

Referring to FIGS. 3-4, first end 24 is used to mount first bead 14. As shown, tip 30 is inserted between first bead 14 and rim flange 19. The front edge 33 of tip 30 is initially inserted between first bead 14 and rim flange 19, and the upwardly angled raised surface of body portion 32 forces the first bead 14 away from tip 30 easing the entry of tip 30. Moreover, the first clearance 36 allows the working end 20 to be angled upwardly from the center of the rim 17 by providing a clearance for the rim flange 19. In this way, the tip 30 is angled upward facilitating its insertion between the bead 14 and rim flange 19.

After the tip 30 is fully inserted, the bead 14 may move inwardly against the surface of body portion 32, which checks any further inward movement the bead 14 as the tool 20 is rotated to stretch first bead 14 over flange 19. Using the flange 19 as a fulcrum, the body portion 32 leverages first bead 14 over rim flange 19. Referring to FIG. 4, the handle 22 is rotated away from the center C of rim 17 in the direction of arrow H with the tip 30 contacting the rim flange 19. Body portion 32 generally forces the first bead 14 outward as the handle 22 rotates. As can be appreciated, the first bead 14, as it is stretched, tends to move inward and migrate upward along body portion 32. The first portion 34, however, beneficially interferes with any upward movement of first bead 14 and traps first bead 14 between body portion 32 and the tip 30. So confined, the tip 30 and first bead 14 remain in an optimal relative position for the continued application of maximum leverage. As working end 24 continues to rotate, first portion 34 forces first bead 14 downward past rim flange 19. Once first bead 14 is beyond rim flange 19, the axial outward extension of tip 30 allows first bead 14 to slip over tip 30 and inward toward rim 17, releasing tool 20.

With first bead 14 mounted on rim 17 (FIG. 5) working end 24 is then used to mount second bead 16. As shown in FIGS. 5-9, second bead 16 is mounted in a similar fashion to first bead 14. Since first bead 14 is in place, second bead 16 must be progressively mounted to rim 17 with a series of insertion movements, commonly referred to as bites, where the mounting process described above is repeated for small radial sections of second bead 16. With each bite, second bead 16 becomes increasingly taut around rim 17 making removal of the tip 30 from between the second bead 16 and rim 17 increasingly difficult. As shown in FIG. 6, the convex inner surface 31 of tip 30 greatly facilitates removal of tip 30 from its tight confinement between the increasingly taut second bead 16 and rim 17. In particular, tip 30 is removed by continuing the rotation of handle 22 (FIG. 6). As the handle 22 continues to rotate, lower surface 31 slides along the rim flange 19 as the upper surface of tip 30 forces the second bead 16 below the rim flange 19. Eventually, rotation causes tip 30 to angle inward toward rim 17, allowing bead 16 to slide inward toward rim 17, releasing tip 30.

It should be apparent that the invention as described above satisfies the stated object, among others. It should further be understood that the preceding is merely a detailed description of a preferred embodiment of this invention and that various modifications and equivalents can be made without departing from the spirit or scope of the invention. The preceding description, therefore, is not meant to limit the scope of the invention. Rather, the scope of the invention is to be determined by the appended claims and their equivalents.

The invention claimed is:

1. A tire mounting tool for mounting a first bead and a second bead of a tire on a rim, the tire mounting tool comprising:
   a handle; and
   a working end extending generally radially outward from said handle, said working end including a tip adapted to be inserted between the rim and a bead of the tire, a body portion extending axially inward as it extends radially inward from said tip, and an extension having a first portion extending radially inward from said body portion and a second portion extending radially inward from said first portion connecting said extension to said handle, wherein said first portion extends radially a distance orthogonal to the handle, said distance of said first portion adapted for receipt between the beads of the tire and wherein said second portion extends axially outward relative to said first portion, said first portion defining a first clearance between said second portion and said body portion, and said second portion then extending radially inward and axially inward toward said handle to define a second clearance between said handle and said first portion adapted to receive the second bead of the tire as the first bead of the tire is mounted.

2. The tire mounting tool of claim 1, wherein said first and second portions are curved and define a substantially S-shaped extension between said body portion and said handle.

3. The tire mounting tool of claim 1, wherein said second portion has a center and said working end has a radial span, wherein said radial span of said working end is sized such that said center of said second portion lies on a center line of said rim.

4. The tire mounting tool of claim 1, wherein said first portion and said second portion, respectively, have a first radial span and a second radial span, wherein said first radial span is about one-half of said second radial span.

5. The working tool of claim 1, wherein said working end has a radial span and said second portion has a radial span, wherein said radial span of said second portion is at least about one-half of said span of said working end.

6. The tire mounting tool of claim 5, wherein said handle has a length greater than said span of said working end.

7. The tire mounting tool of claim 1, wherein said working end has a radial span and said extension has a radial span, wherein said radial span of said extension is less than the span of said working end and said span of said extension is at least about 75 percent of the span of said working end.

8. The tire mounting tool of claim 1, wherein said handle has an offset portion that extends radially outward in the direction of said working end.

9. A tire mounting tool for mounting first and second beads of a tire on a rim, the tire mounting tool comprising:
   a handle; and
   a working end extending generally radially outward from said handle, said working end including a tip adapted to be inserted between the rim and a bead of the tire; a body portion extending radially and axially inward from said tip; and an extension including a first portion extending radially inward from said body portion, a second portion extending axially outward from said first portion defining a first clearance opening axially outward adjacent to said first portion, and radially inward to connect to said handle defining a second clearance opening axially inward adjacent to said second portion; wherein said first and second portions each extend radially a distance orthogonally to the handle, wherein the distance of said second portion is equal to or greater than the extent of said first portion.

10. A method of mounting at least a first bead of a tire on a rim, the method comprising:
    providing a tire mounting tool having a handle and a working end extending generally radially outward from said handle, said working end including a tip adapted for insertion between the rim and a bead of the tire, a body portion extending axially inward as it extends radially inward from said tip, and an extension having a first portion extending radially inward from said body portion and a second portion extending radially inward from said first portion connecting said extension to said handle, wherein said second portion extends axially outward relative to said first portion, said first portion defining a first clearance between said second portion and said body portion, wherein said first portion extends radially a distance orthogonal to the handle adapted for receipt between the beads of the tire and wherein said second portion then extends radially inward toward said handle and defines a second clearance between said handle and said first portion adapted to receive the second bead of the tire as the first bead of the tire is mounted;
    inserting the tip between the first bead and the rim with the handle held upright and generally centered over the rim;
    contacting the tip with the rim to use the tip as a fulcrum;
    rotating the handle radially outward relative to the center of the rim causing the first portion of the extension to extend between the first and second beads while receiving the second bead in the second clearance; and
    applying body weight downward against the handle to continue its rotation and stretch the first bead onto the rim.

11. The method of claim 10 wherein
    removing the tip from between the first bead and the rim;
    inserting the tip between the second bead and the rim with the handle extending upward over the rim;
    rotating the handle radially outward relative to the rim to lever the second bead onto the rim; and
    continuing rotation of the handle until the tip is released from between the rim and the second bead.

12. The method of claim 11, wherein the step of inserting the tip between the second bead and the rim includes setting the second portion of the extension in the center bore of the rim, prying the second bead away from the rim to insert the tip by rotating the handle from a generally vertical position away from the working end causing the tip to move upward and outward against the second bead.

13. A tire mounting tool for mounting a first bead and a second bead of a tire on a rim, the tire mounting tool comprising:
    a handle;
    a working end extending generally radially outward from said handle, said working end including a tip adapted to be inserted between the rim and a bead of the tire, a body portion extending axially inward as it extends radially outward from said tip, and an extension having a first portion extending radially inward from said body and a second portion extending radially inward from said first portion connecting said extension to said handle, wherein said first portion extends radially a distance orthogonal to the handle, said distance of said first portion adapted to receiving between the beads of the tire and wherein said second portion extends axially outward relative to said first portion, said first portion defining a first clearance between said second portion and said body portion, and said second portion then extending radially inward and axially inward toward said handle to define a second clearance between said handle and said first portion adapted to receive the second bead of the tire as the first bead of the tire is mounted; and wherein said first and second portions are curved and define a substantially S-shaped extension between said body portion and said handle.

14. A tire mounting tool for mounting a first bead and a second bead of a tire on a rim, the tire mounting tool comprising:

a handle;

a working end extending generally radially outward from said handle, said working end including a tip adapted to be inserted between the rim and a bead of the tire, a body portion extending axially inward as it extends radially outward from said tip, and an extension having a first portion extending radially inward from said body and a second portion extending radially inward from said first portion connecting said extension to said handle, wherein said first portion extends radially a distance orthogonal to the handle, said distance of said first portion adapted to receiving between the beads of the tire and wherein said second portion extends axially outward relative to said first portion, said first portion defining a first clearance between said second portion and said body portion, and said second portion then extending radially inward and axially inward toward said handle to define a second clearance between said handle and said first portion adapted to receive the second bead of the tire as the first bead of the tire is mounted; and wherein said working end has a radial span and said second portion has a radial span, wherein said radial span of said second portion is at least about 1½ of said span of said working end.

* * * * *